Feb. 24, 1925. 1,527,526
R. RODRIAN
ELECTROLYTIC PROCESS AND APPARATUS FOR THE EXTRACTION OF METALS
Filed Nov. 10, 1922
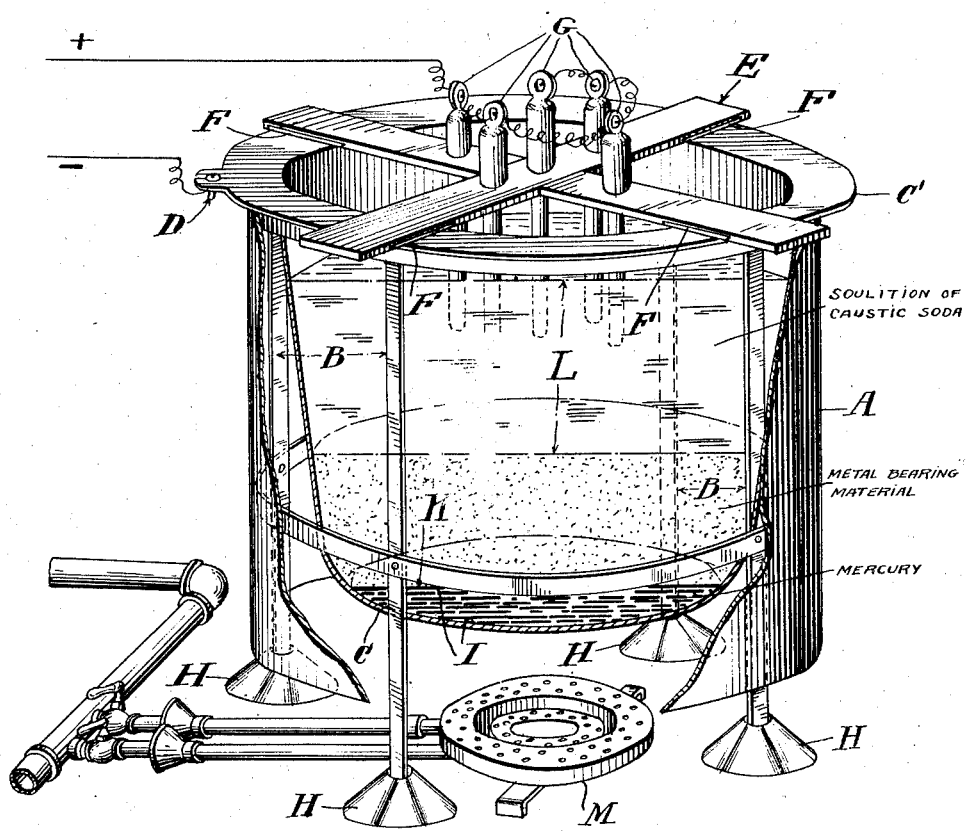
Inventor
RICHARD RODRIAN
By
Attorneys Patented Feb. 24, 1925.

1,527,526

UNITED STATES PATENT OFFICE.

RICHARD RODRIAN, OF NEW YORK, N. Y., ASSIGNOR, BY MESNE ASSIGNMENTS, TO HANS ADELMANN, OF NEW YORK, N. Y.

ELECTROLYTIC PROCESS AND APPARATUS FOR THE EXTRACTION OF METALS.

Application filed November 10, 1922. Serial No. 599,970.

*To all whom it may concern:*

Be it known that I, RICHARD RODRIAN, a citizen of Germany, and resident of the borough of Manhattan, city, county, and State of New York, have invented certain new and useful Improvements in Electrolytic Processes and Apparatus for the Extraction of Metals, of which the following is a specification.

My invention relates to the extraction of metals from ores and other minerals or metal-bearing materials, such as slag, scrap and residue. According to the present invention the material in a finely comminuted form is melted with a caustic alkali, and is then electrolyzed while preferably heating it, above a layer of mercury or amalgam.

My invention will be described more fully hereinafter.

The accompanying drawing illustrates in perspective with parts broken away, an apparatus suitable for carrying out my present invention.

A indicates a screen or outer shell made of iron or other suitable material, and supported by means of legs B, the lower ends of which are set in sockets H made of glass or other insulating material and resting on the floor or other support. On the upper edge of shell or screen A is supported the iron vessel C provided with an outwardly extending flange C' at its upper edge and connected, as at D, with the negative pole of a source of electricity. On said flange rest two cross pieces E generally made of wood and preferably having inserts F of plate glass or other insulating material to engage said flange. The said cross pieces E serve as supports for rod-like electrodes G of which I have shown five; these electrodes may be made of iron and are connected with the positive pole of the source of electricity. The number and arrangement of electrodes may vary. Below the bottom of the vessel C is located a suitable device for heating it, for instance a gas burner N.

The material to be treated is first, if required, brought into the form of a fine powder in any suitable manner. This fine material together with caustic alkali is placed within the vessel C and melted by heat supplied by means of the burner N. The material may consist for instance of one hundred (100) pounds of lead sulfid (galena) and the same amount of commercial caustic soda granular or in lumps is added, the capacity of the vessel C being about fifty (50) gallons. After the mineral and caustic soda have been melted together, I add water almost to the top of the vessel. I also pour in a layer, indicated in the drawing at I, and consisting of, for instance, one hundred (100) pounds of mercury, to which I prefer to add five (5) pounds of lead. (When, in my claims, I speak of mercury I intend to include in such term an amalgam.) The vessel C will then, as shown in the drawing, contain at the bottom the layer I consisting chiefly or exclusively of mercury and then a layer K consisting of the mass of material to be treated, and the upper layer L consists of a solution of caustic soda and of the salts which have been dissolved from the molten mass. This liquid L therefore constitutes an electrolyte of caustic alkaline character. In some cases, for instance when treating metal compounds which are soluble in caustic alkali, it may be desirable to employ a neutral or an acid electrolyte, and this condition may be obtained by adding a suitable amount of acid to the liquid L, the iron of the positive electrode then going into solution and replacing the more valuable metal in such compound. The electrodes G dip into the electrolyte, but preferably do not reach the layer K. The current is then turned on and at the same time heat is applied to the vessel as before. The current may be a continuous current of from 8 to 24 volts, and from 20 to 100 amperes. The voltage and amperage may be varied, but in any event the electrodes dipping into the electrolyte L will be positive while the negative electrode will be formed by the vessel, and by the mercury layer I. The passage of the current through the material in the vessel C will cause the metals present as such to combine with the mercury so as to form amalgams therewith. Any metals present in the material as oxides, sulfids, or salts will be thrown down on the cathode by the action of the electric current as finely divided metals, and will likewise combine with the mercury to form amalgams. Furtherfore, the mercury will form an amalgam with the metal of the electrolyte, that is to say with sodium in case the mineral was melted with caustic soda, or potassium if caustic potash was used. The amalgam of sodium or potassium thus obtained is much more efficient in attracting and holding the other metals thrown down from material under treatment than pure mercury would be. The addition of lead made to the mercury at the beginning of the electrical process is for the purpose of obtaining a more compact metal alloy; instead of lead I may use other metals, for instance, tin or zinc. I desire it to be understood however, that the addition of lead, tin, zinc or equivalent metal to the mercury is not absolutely essential. Heating the vessel C and its contents also promotes the electrolytic action and insures greater fluidity of the mercury and of the amalgams resulting from the treatment so that these amalgams will be more efficient in taking up the other metals. The heat applied during the electrolytic treatment should preferably be such as to cause the contents of the vessel to boil, and the violent motion will assist in promoting the reaction and in allowing the metals extracted by electrolysis to sink to the bottom and combine with the mercury to form amalgams. Instead of boiling the contents of the vessel, or in addition to such boiling, agitation by mechanical means or by the injection of air, steam, etc., may be resorted to.

After the completion of the electrolytic treatment, the electrolyte and the residue of the layer K are separated from the mercury amalgam so that only the mercury amalgam remains at the bottom of vessel C. This mercury amalgam is then brought into a mercury still where, by heating in a well-known manner, the mercury is distilled off, leaving the other metals as the final product of the process. In the particular example described, the electric current supplied may be of 50 amperes and 20 volts, and the electrolytic treatment will be completed in about twenty hours.

In place of the solid caustic alkali I may use a solution thereof, preferably concentrated, and I may melt the metal-bearing materials in such solution or add them in a molten condition to such solution.

I claim as my invention:

1. The herein described process of extracting metals from metal-bearing material which consists in bringing said material into contact with a solution of a caustic alkali, and electrolyzing the mass over a layer of mercury.

2. The process of extracting metals from metal-bearing material which consists in melting the material with caustic alkali, then diluting the resulting mass with water and electrolyzing the resulting mass above a layer of mercury.

3. The herein described process of extracting metals from comminuted metal-bearing material containing metal compounds soluble in caustic alkali which consists in bringing the material in contact with a hot solution of caustic alkali, then adding an acid in amount sufficient at least to neutralize the alkali, and electrolyzing the mass over a layer of mercury.

4. An apparatus for the purpose described, comprising a metal shell or screen, legs for supporting said shell or screen, insulating supports at the lower ends of said legs, and a metal vessel having an outwardly projecting flange resting on the upper edge of said screen so that the vessel may be suspended in the screen.

5. An apparatus for the purpose described, comprising a metal shell or screen, legs for supporting said shell or screen, insulating supports at the lower ends of said legs, and a metal vessel having an outwardly projecting flange resting on the upper edge of said screen so that the vessel may be suspended in the screen, and means for heating said vessel.

6. In apparatus for the purpose described, a metal vessel, means for heating said vessel, cross pieces laid on the upper edge of said vessel, electrodes supported by said cross pieces, and glass plates set in said cross pieces where the same extend across the top of the vessel.

In testimony whereof I have hereunto set my hand.

RICHARD RODRIAN.